April 10, 1962 K. WILFERT ETAL 3,029,090
TORSION SPRING SYSTEM FOR MOTOR VEHICLES
Filed May 13, 1959
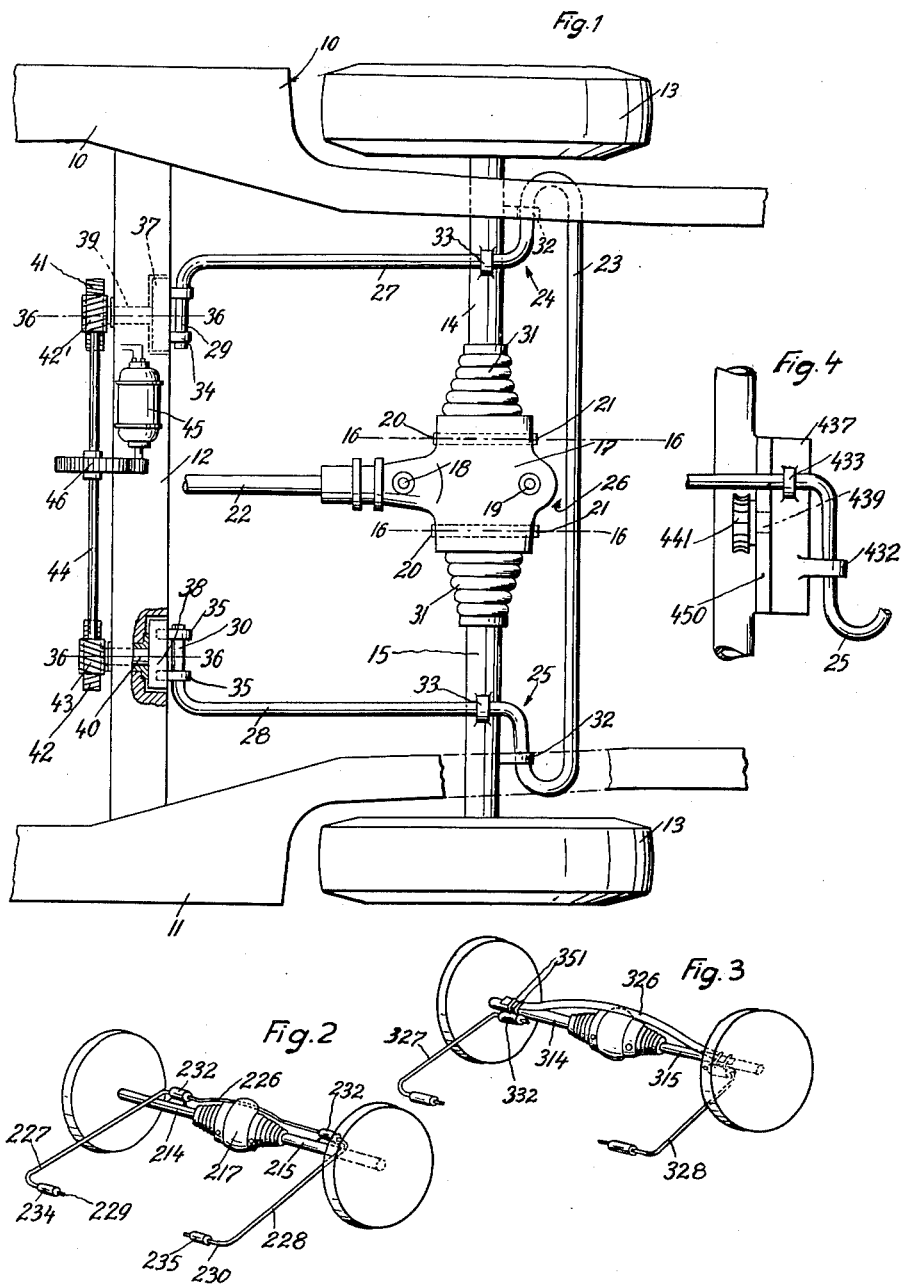
Inventor
KARL WILFERT AND ERNST J. H. FIALA
BY Dickey, Craig and Freudenberg
ATTORNEYS United States Patent Office 3,029,090
Patented Apr. 10, 1962

3,029,090
TORSION SPRING SYSTEM FOR MOTOR
VEHICLES
Karl Wilfert, Stuttgart-Degerloch, and Ernst J. H. Fiala, Sindelfingen, Kreis Boblingen, Germany, assignors to Daimler-Benz Aktiengesellschaft, Stuttgart-Untertürkheim, Germany
Filed May 13, 1959, Ser. No. 813,615
Claims priority, application Germany May 13, 1958
13 Claims. (Cl. 280—124)

Our invention relates to a spring system for vehicles, particularly motor vehicles of the type in which the wheels are guided relative to the chassis or body for up and down movement by transversely extending pivotal members, such as half axles, links or the like.

It is the primary object of our invention to provide an improved spring system acting as a relatively hard spring when constraining relative up and down movements of both of a pair of wheels in the same direction and as a relatively soft spring when constraining movements of the wheels in opposite directions. Such a differential spring reaction is frequently desirable. When the vehicle is driven through a curve producing a centrifugal tilting couple on the body tending to move the outer wheel upwardly and to move the inner wheel downwardly relative to the body, a relatively soft reaction of the spring system upon the rear wheels will have the effect that the major portion of such couple must be taken up by the front wheels and this reduces any oversteering tendency of the vehicle that might exist, as is highly desirable.

More particularly, it is an object of our invention to provide an improved springing system of the type indicated hereinabove which is simple and endurable and has a low weight and may be easily assembled and disassembled.

Moreover, it is an object of our invention to reduce the twisting couple exerted by the springing system upon the chassis or body of the vehicle to a minimum.

Further objects of our invention will appear from a detailed description of a number of embodiments of our invention following hereinafter and the features of novelty will be pointed out in the appended claims. We wish it to be understood, however, that our invention is in no way limited to such details but is capable of numerous modifications within the scope of the appended claims and that the terms and phrases used in the detailed description following hereinafter have been chosen for the purpose of explaining the invention rather than that of restricting or limiting the same.

In the accompanying drawing,

FIG. 1 is a plan view of the rear end of a chassis equipped with our improved springing system, FIG. 2 is a perspective view of a modification of the springing system shown in FIG. 1, the chassis itself being omitted, FIG. 3 is a view similar to that of FIG. 2 of a further embodiment of our invention in which the springing system includes three separate spring elements, and FIG. 4 relates to a modification of the system shown in FIGURE 1 showing a modified portion of such figure.

A chassis which may or may not form an integral portion of the body of the vehicle comprises a pair of lateral longitudinal beams 10 and 11 connected by horizontal transverse beams including a beam 12 having its ends welded or otherwise rigidly connected to the beams 10 and 11 and being located in front of and spaced from the rear wheels 13 each of which is rotatably carried by the outer end of a half axle 14, or 15 respectively. Each of the half axles constitutes a member that is pivotally connected to the body for oscillation about a substantially horizontal longitudinal axis indicated by the dash-dotted line 16—16. For this purpose, a rear axle transmission housing 17 is mounted upon a suitable element of the body, such as another transverse beam that extends parallel to the beam 12 but is omitted from FIG. 1 for sake of clarity, the housing being secured to such beam by means of rubber cushions diagrammatically indicated at 18 and 19. The inner end of each half axle 14, or 15 respectively, has a pair of horizontal trunnions 20 and 21 disposed coaxially with the axis 16—16 and journaled in suitable bearings forming part of the housing 17. Lateral openings of housing 17 through which the half axles 14 and 15 extend outwardly are closed by resilient bellows 31 in the conventional manner. The rear axle transmission serves the purpose of establishing a driving connection between a central longitudinal shaft 22 geared to the engine and wheel drive shafts rigidly connected to the wheels and extending through the hollow half axles 14 and 15 from the wheels into the housing 17.

Our novel spring system comprises a spring formed by an elastic elongated element, such as a steel rod 23 having a central main portion 26 that extends horizontally and transversely to the vehicle and adjoining portions 24 and 25 which are disposed in proximity of the members 14 and 15, each of the portions 24 and 25 being mounted on one of said members 14 and 15 in an invariable substantially parallel relationship thereto.

In the embodiment shown in FIG. 1 the rod 23 is extended beyond the portions 23 and 24 forming end sections 27 and 28 which are located beyond the spaced portions 24 and 25 and have bent ends 29 and 30, all of the sections or portions 24—30 being formed by a single rod of preferably uniform diameter bent to the shape shown in FIG. 1.

Each of the portions 24 and 25 of the spring rod is U-shaped comprising a pair of arms extending within a plane which is substantially parallel to the associated half axle 14, or 15 respectively. The rear arm of each U-shaped portion is a continuation of the central portion 26 of the spring rod, whereas the front arm is bent forwardly, where it is joined to the end section 27, or 28 respectively. The front arm of the U-shaped portion 24, or 25 respectively, is secured to the associated member 14, or 15 respectively, at spaced points by brackets 32 and 33. These brackets 32 and 33 are fixed to the half axle 14, or 15 respectively, and are provided with bores which are lined by rubber bushings through which the portion 24 or 25 of the spring rod extends. The bracket 32 maintains a first section of the U-shaped portion 24 or 25 so as to extend transversely of the vehicle, whereas the bracket 33 disposed on the other side of the bend holds a second section of portion 24 or 25 so as to extend lengthwise of the vehicle. In this manner each of the portions 24 or 25 is mounted on the half axle in an invariable relationship thereto. Preferably, the plane in which the portion 24 or 25 of the spring rod is maintained by the brackets 32 and 33 is parallel to the half axle or includes an acute angle therewith that may vary between 0° and 20°.

Suitable means are provided for pivotally connecting the ends 29 and 30 of the end sections 27 and 28 to the body of the vehicle. For this purpose the transverse beam 12 is provided with two pairs of brackets, one pair 34 constituting spaced coaxial bearings for the end 29 of the spring rod and the other pair 35 constituting spaced coaxial bearings for the end 30 of the spring rod. Preferably, the bearing means 34 and 35 are angularly adjustable about axes 36—36 extending lengthwise of the vehicle and suitable actuating means are mounted on the body of the vehicle and are connected with the bearing means 34 and 35 for the angular adjustment thereof. In the embodiment illustrated in FIG. 1 each of the pairs 34 and 35 of bearings is fixed to and carried by a circular plate 37, or 38, respectively, mounted on the transverse beam 12 in coaxial relationship to the axis 36—36 and provided with a pin 39, or 40 respectively, journaled in a suitable bearing carried by the transverse beam 12. A worm gear 41, or 42 respectively, fixed to the pin 39, or 40 respectively, meshes with a worm 42′, or 43 respectively, fixed to a shaft 44 journaled in suitable bearings (not shown) fixed to beam 12 and adapted to be driven by an electric motor 45 by means of a reduction gearing 46. The motor 45 is preferably secured to the beam 12 and is adapted to be manually controlled by suitable switches. Hence, the elements 41—46 constitute actuating means which are connected with the bearing means 34, 35 for the angular adjustment thereof.

The operation of the spring system described hereinabove with reference to FIG. 1 is as follows: When both wheels 13 perform springing motions in the same direction relative to the body, as will occur, for instance, when the vehicle is driven over a ridge extending across the road, both of the half axles 14 and 15 will pivot upwardly about the axes 16—16, thereby changing the angle included between their axes. As a result, a similar change of the angular relationship occurs between the plane in which the portion 24 of the spring rod is held and the plane in which portion 25 is maintained. As a result, the portion 26 of the spring rod will be bent. Additionally the end sections 27 and 28 of the spring rod will act as torsional springs on account of the angular displacement of the planes just mentioned with respect to the ends 29 and 30. Hence, it will appear, that restoring forces will be exerted on the half axles by the end sections 27 and 28 and by the central section 26 of the spring rod so that the spring system will act as a comparatively hard spring producing a powerful restoring force.

Springing motions of the half axles in opposite directions, however, for instance an upward movement of the half axle 14 and a downward motion of the half axle 15, will not result in any substantial flexure of the central portion 26 of the spring rod as this portion may tilt without any substantial deformation when both angular displacements of the half axles are opposite and of substantially the same degree. In that event, therefore, the end sections 27 and 28 only of the spring rod will produce restoring forces acting as torsional springs. The result will be a comparatively soft springing effect. This soft springing effect will improve the performance of the car when driven through curves because the major portion of the rolling couple exerted by the centrifugal force upon the body of the car tending to tilt same outwardly must be taken up by the front wheels. This will counteract any tendency to oversteering that might exist.

The peculiar shape of the spring rod 23 shown in FIG. 1 including two opposite bends in each of the portions 24 and 25 and the bends between the sections 27 and 28 and the ends 29 and 30 affords a possibility of accommodating a spring rod of a considerable total length and total volume within a restricted space without necessitating an attachment of the spring rod to the wheel-guiding members in close proximity to the wheels which would be undesirable because the space adjacent to the wheels is usually required for the accommodation of brakes or the like. Moreover, it will be appreciated that the peculiar shape of the spring rod 23 described hereinabove affords the advantage that the transversely extending portion 26 thereof is located within a region where it does not interfere with the axle transmission or the beam of the chassis carrying such transmission.

Moreover, it will be appreciated that the end sections 27 and 28 of the spring rod 23 perform the dual function of acting as torsional springs and of acting as wheel guiding elements which will guide the wheel-carrying members 14 and 15 in their up and down movement and will act as braces taking up propulsion and braking forces. This is another important advantage of our invention. Another advantage is the fact that twisting forces produced by the ends 29 and 30 of the torsional springs 27 and 28 are exerted on the chassis at points which are substantially spaced from the half axles 14 and 15 being located at the transverse beam 12, i.e. substantially below the rear seats of the car, whereby the deformation produced by such twisting forces will be considerably reduced.

By operating the electric motor 45 in a suitable manner, for instance by means responsive to the load of the vehicle or by the driver, the road clearance may be maintained substantially independent of the load, since any rotary adjustment of the bearings 34 and 35 effected by the actuating means described hereinabove will have the effect of raising or lowering the half axles relative to the body of the vehicle.

In FIGURE 4, we have illustrated a modification of the system shown in FIGURE 1. In this modification, the bearings 34 and 35 are fixed to the transverse beam 12 and the brackets 432 and 433 through which the spring rod extends are carried by a circular plate 437 which is rotatably mounted on a vertical flange 450 of the half axle for angular displacement by suitable actuating means which may be similar to those shown in FIGURE 1 and include a pin 439 fixed to the plate 437 and a worm wheel 441 fixed to the pin 439. By rotary adjustment of the plate 437, the angular relationship between the half axle and the plane in which the portion 25 of the spring rod is maintained by the brackets 432 and 433 may be varied to thereby vary the road clearance.

Another embodiment of our novel spring system is illustrated in FIG. 2. In this modification each of the half axles 214 and 215 is provided with a parallel bearing 232 through which the ends of the central portion 226 of the spring rod extends. Beyond the bearings 232 the spring rod is bent forwardly and is continued by the end sections 227 and 228 having bent ends 229 and 230 journaled in brackets 234 and 235 fixed to the transverse beam of the car. In this embodiment of our invention the spring rod has a simpler shape but this shape does not permit to accommodate as large a volume of spring material within the limited space as in FIG. 1. Moreover, the central spring portion 226 must be bent not to interfere with the rear axle transmission 217.

In FIG. 3 we have illustrated an embodiment in which a spring leaf 326 has been substituted for the central portion 226 of the spring rod shown in FIG. 2. The ends of the spring leaf 326 are secured to the half axles 314 and 315 by suitable straps 351 so as to be held thereby in an invariable substantially parallel relationship to the half axle. The spring sections 327 and 328 corresponding to the spring sections 227 and 228 of FIG. 2 have been retained, however. In this embodiment the bearings 332 are fixed to the lower side of the half axles 314, and 315 respectively.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a vehicle the combination comprising a body, a pair of wheels, means for individually guiding said wheels for up and down movement relative to said body, said means including members individually coordinated to said wheels, and a spring formed by an elastic elongated element constraining the movement of said wheels, said spring being formed by an elastic elongated rod which includes a pair of spaced, substantially parallel portions extending essentially in the longitudinal direction of the vehicle, a substantially U-shaped section connected with each of said spaced portions and having a pair of arms extending within a substantially horizontal plane, one of the arms being secured to one end of the corresponding longitudinal portion, and a portion interconnecting the other of said arms with the other arm of the second of said U-shaped portions.

2. The combination as defined in claim 1, wherein said body of the vehicle includes at least one transverse bearer member, a pair of plates pivotally attached to said transverse bearer member, bearing means operatively connecting the other end of each longitudinally extending portion to one of said plates, and actuating means connected to each of said plates for angular adjustment thereof.

3. The combination as defined in claim 1, further including adjustable means for mounting each of the said one arms of the U-shaped sections on a respective one of the means for individually guiding the wheels for angular adjustment about an axis extending lengthwise of the vehicle.

4. In a vehicle the combination comprising a body, a pair of wheels, means for individually guiding said wheels for up and down movement relative to said body, said means including members individually coordinated to said wheels, each member being pivotally connected to said body for oscillation about a substantially horizontal longitudinal axis, and a spring formed by an elastic elongated element extending transversely to said vehicle in proximity of said members and having a pair of U-shaped spaced portions, each comprising a pair of arms extending essentially transversely of the vehicle within a substantially horizontal plane, one of the arms of each said portion being secured to a respective one of said members.

5. The combination claimed in claim 4 in which said one of said arms of said elastic elongated member is so bent as to form a first section extending transversely of the vehicle and a second section extending lengthwise of the vehicle, said combination further including means for securing said first section and said second section of said arm to said one of said members.

6. In a vehicle the combination comprising a body, a pair of wheels, means for individually guiding said wheels for up and down movement relative to said body, said means including members individually coordinated to said wheels, each member being pivotally connected to said body for oscillation about a substantially horizontal longitudinal axis, and a spring formed by an elastic elongated element extending transversely to said vehicle in proximity of said members and having a pair of spaced U-shaped end portions, each of said end portions including an arm extending transversely of the vehicle, each of the arms being secured to the respective one of said members in an invariable substantially parallel relationship thereto.

7. In a vehicle the combination comprising a body, a pair of wheels, means for individually guiding said wheels for up and down movement relative to said body, said means including members individually coordinated to said wheels, each member being pivotally connected to said body for oscillation about a substantially horizontal longitudinal axis, and spring means including an elastic elongated element extending transversely to said vehicle into proximity of said members and a pair of spaced portions, said elongated element including a pair of U-shaped end portions each including an arm extending transversely and inwardly of said vehicle, each said arm being secured to a respective one of said members in an invariable substantially parallel relationship thereto, and each of said spaced portions extending essentially longitudinally of the vehicle and being secured to said body.

8. In a vehicle the combination comprising a body, a pair of wheels, means for individually guiding said wheels for up and down movement relative to said body, said means including members individually coordinated to said wheels, each member being pivotally connected to said body for oscillation about a substantially horizontal longitudinal axis, spring means formed by an elastic elongated element including a central section extending transversely to said vehicle in the proximity of said members, a pair of spaced portions extending longitudinally of said vehicle, and a pair of intermediate sections connecting the ends of said central section with said spaced portions, said intermediate sections extending outwardly of said spaced portions and said central section, means for mounting each said intermediate sections on respective ones of said members in an invariable relationship thereto, and means for connecting the free ends of said spaced portions to said body.

9. In a vehicle, the combination comprising a body, a pair of wheels, means for individually guiding said wheels for up and down movement relative to said body, said means including members individually coordinated to said wheels, each member being pivotally connected to said body for oscillation about a substantially horizontal longitudinal axis, a spring formed by an elastic elongated element extending transversely to said vehicle into the proximity of said members and having a pair of spaced portions each of which is mounted on one of said members in an invariable substantially parallel relationship thereto, a central section located between said spaced portions and end sections located beyond said spaced portions and extending lengthwise of said vehicle, and means for pivotally connecting the ends of said end sections to said body.

10. The combination claimel in claim 9 in which said end sections of said elastic elongated element constitute springs restraining said up and down movement of said wheels relative to said body.

11. The combination claimed in claim 9 in which said means for pivotally connecting the ends of said end sections to said body have a substantially horizontal pivot axis extending transversely of the vehicle.

12. The combination claimed in claim 9 in which the ends of said end sections are bent to extend horizontally at right angles to said end sections, said combination further comprising bearing means mounted on said body for journaling said ends.

13. The combination claimed in claim 12 in which said bearing means are angularly adjustable about axes extending lengthwise of the vehicle, said combination further comprising actuating means mounted on said body and connected with said bearing means for the angular adjustment thereof.

References Cited in the file of this patent
UNITED STATES PATENTS

| | | |
|---|---|---|
| 2,497,459 | Leighton | Feb. 14, 1950 |
| 2,607,610 | Allison | Aug. 19, 1952 |
| 2,753,007 | Read | July 3, 1956 |
| 2,755,875 | Muller | July 24, 1956 |

FOREIGN PATENTS

| | | |
|---|---|---|
| 956,023 | Germany | Jan. 10, 1957 |